P. F. DANIELSSON.
MEASURING VESSEL FOR LIQUID MEASURING APPARATUS.
APPLICATION FILED APR. 22, 1909.
1,000,079.
Patented Aug. 8, 1911.
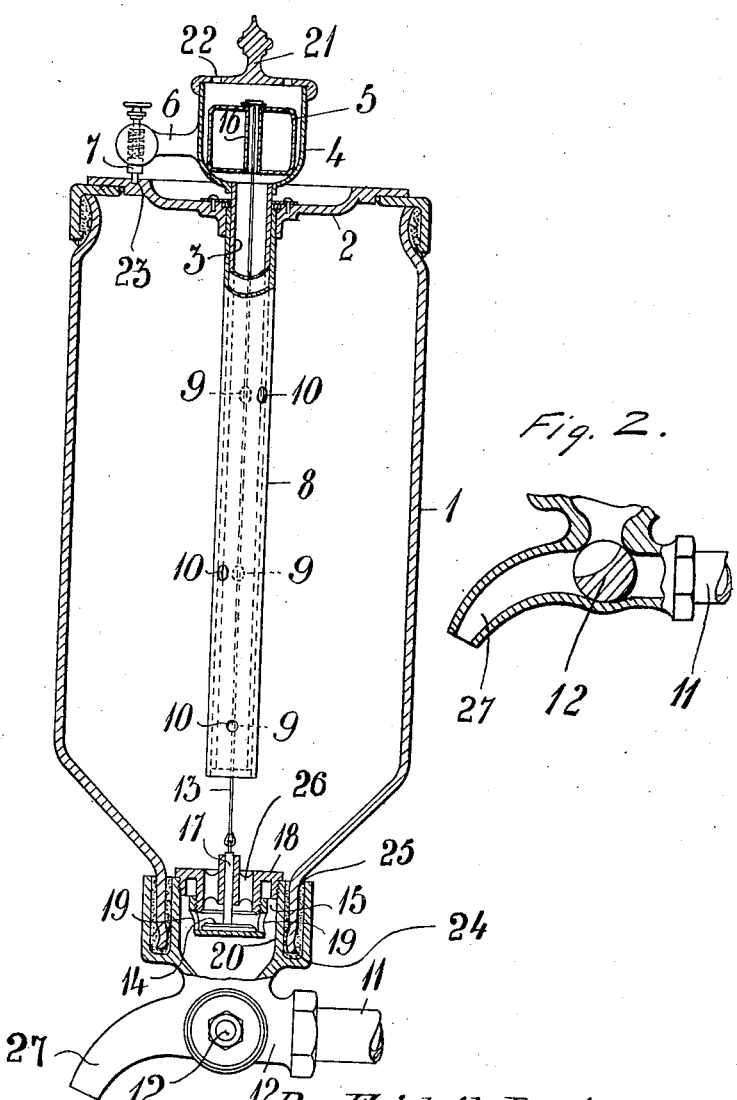

UNITED STATES PATENT OFFICE.

PER FRIDRIK DANIELSSON, OF SÖDERTELJE, SWEDEN, ASSIGNOR TO CARL ERIK GUSTAF RAMSTROM, OF SÖDERTELJE, SWEDEN.

MEASURING VESSEL FOR LIQUID-MEASURING APPARATUS.

1,000,079.  Specification of Letters Patent.  Patented Aug. 8, 1911.

Application filed April 22, 1909. Serial No. 491,550.

*To all whom it may concern:*

Be it known that I, PER FRIDRIK DANIELSSON, a citizen of the Kingdom of Sweden, residing at Södertelje, Sweden, have invented a new and useful Improvement in Measuring Vessels for Liquid-Measuring Apparatus, of which the following is a specification.

The present invention has for its object to provide an improved liquid measuring apparatus wherein the quantity of liquid desired is obtained by having the flow from the liquid reservoir into the measuring vessel controlled by a float operated valve at the lower extremity of the measuring vessel, the quantity of liquid contained in said vessel being determined by a series of orifices in rotary adjusting pipes vertically secured in the said vessel.

The invention also has for its object to provide a simple and accurate means whereby a given quantity of liquid may be measured without reference to the amount of the liquid contained in the reservoir over and above that which is required to fill the measuring vessel; and also to provide an apparatus which may be secured to all classes of reservoirs.

In the accompanying drawing, Figure 1 is a central vertical section of the device embodying my invention, and Fig. 2 is a detail sectional view of an outlet valve.

The measuring vessel forming the subject matter of the present invention comprises a cylindrical glass vessel 1, the lower end of which is tapered, and is provided with a valve mechanism which will be hereinafter more fully described. At its top the vessel is provided with a tightly fitting cover 2 which may be provided with any suitable packing. A pipe 3 passes through an orifice centrally located in the said cover into the vessel 1, and supports at its upper extremity a cup 4 which has in its upper side the vents 22 for the purpose of supplying a sufficient atmospheric pressure and is provided with a laterally extending arm 6 carrying at its outer end the spring-pressed pin 7 adapted to be retained in recesses 23 in the upper side of the cover, said recesses corresponding in number and position to the openings in a pipe to be presently described, in which the pipe 3 is rotatably fitted.

To the cover is threaded a pipe 8 in which the pipe 3 fits snugly but rotatably. This pipe 8 has a series of openings 10 arranged out of vertical alinement each of which is adapted to register with one of a series of openings 9 in the pipe 3, the said openings 9 being in vertical alinement.

Adapted to reciprocate in the cup 4 is a float 5 having centrally secured thereto a wire 13 which extends downward through the pipes 3 and 8 and is secured to a valve 14 through the instrumentality of a pin 17 in the central orifice of the valve seat or plate 18 threaded into a cup 20 formed on the upper side of the supply pipe 11, the said cup having an annular groove 25 in which the lower edge of the tank is secured by a packing 24. On the under side of the plate 18 is carried a valve container 19 having side openings adjacent the inlet openings 26 in the plate 18. The valve 14 is secured to the pin 17, and when arranged to permit the flow of the liquid rests against the base of the container 19 but when the flow is to be cut off rests against the valve seat 18 so as to cover the lower ends of the ports or passages 26.

The inlet pipe 11 is provided with an ordinary two-way valve 12, which when in one position permits the liquid to flow from the reservoir past the valve 14 into the cylindrical tank 1 without any of the same passing through the nozzle 27. When in the other position, this valve 12 cuts off the flow from the reservoir and permits the liquid in the tank to escape through the nozzle.

The operation of the invention is as follows: The pipe 3 is rotated on the interior of the pipe 8 until the desired orifices 9 and 10 register, as shown in the drawings, the pin 7 dropping into an orifice 23 in the cover and holding the pipe 3 in its adjusted position. The two-way valve 12 is then turned so as to permit the liquid to flow into the vessel 1 until it reaches the registering openings 9 and 10 through which it will pass and rise in the pipe 3 to bear against the float 5 and raise the same, thereby lifting the valve 14 and closing the ports 26, the pressure of the air contained in the tank above the liquid preventing the same from rising higher therein than the registering openings 9 and 10. After the valve 14 has closed the ports 26, the valve 12 is turned so as to close the inlet pipe 11 and allow the liquid contained in the measuring vessel to flow through the nozzle 27, and thus the desired quantity of liquid will be delivered.

Having thus described my invention, what I claim and desire to secure by Letters Patent is:—

In a device of the class described, a receptacle; a fixed tube therein; a tube rotatable in the fixed tube; a chamber secured to the rotatable tube upon the outside of the receptacle; there being openings in one tube, out of alinement with each other longitudinally of said tube, and adapted to be brought successively into registration with similar openings in the other tube; a float located in the chamber; a valve adapted to close the receptacle at a point remote from the chamber; a rod permanently connected directly to the float and likewise connected with the valve, the rod being located within the rotatable tube, and being spaced throughout its entire length from said tube, to provide for a free passage of liquid through said tube into said chamber; and a locking device adapted to prevent the rotatable tube from having movement with respect to the receptacle.

In testimony that I claim the foregoing as my own, I have hereto affixed my signature in the presence of two witnesses.

PER FRIDRIK DANIELSSON.

Witnesses:
JOHAN FREDRIK ALARIK RUTBÄCK,
BERMA ZERGSTRÄM.

---

Copies of this patent may be obtained for five cents each, by addressing the "Commissioner of Patents, Washington, D. C."